(12) United States Patent
Thompson

(10) Patent No.: US 9,912,901 B2
(45) Date of Patent: Mar. 6, 2018

(54) BODY CAMERA

(71) Applicant: S4 WORLDWIDE, LLC, Doylestown, PA (US)

(72) Inventor: Patrick J. Thompson, Newtown Square, PA (US)

(73) Assignee: S4 WORLDWIDE, LLC, Doylestown, PA (US)

(*) Notice: Subject to any disclaimer, the term of this patent is extended or adjusted under 35 U.S.C. 154(b) by 61 days.

(21) Appl. No.: 14/974,377

(22) Filed: Dec. 18, 2015

(65) Prior Publication Data

US 2016/0182850 A1     Jun. 23, 2016

Related U.S. Application Data

(60) Provisional application No. 62/093,807, filed on Dec. 18, 2014.

(51) Int. Cl.
| | | |
|---|---|---|
| *H04N 5/00* | (2011.01) | |
| *H04N 5/77* | (2006.01) | |
| *G06F 1/16* | (2006.01) | |
| *H04L 29/06* | (2006.01) | |
| *H04N 1/00* | (2006.01) | |
| *H04N 9/82* | (2006.01) | |
| *H04N 7/18* | (2006.01) | |

(52) U.S. Cl.
CPC ............ *H04N 5/77* (2013.01); *G06F 1/163* (2013.01); *H04L 65/4069* (2013.01); *H04N 1/00106* (2013.01); *H04N 7/185* (2013.01); *H04N 9/8205* (2013.01)

(58) Field of Classification Search
CPC .......... G06K 9/00; H04N 5/232; G01C 21/32; G01C 21/36; G01C 21/3667; G01C 23/00; G08G 1/0969; G05B 19/00; A61M 5/20; G05D 1/00; G05D 1/10; G05D 1/02; G05D 1/005; G06Q 10/08; A63H 27/00; A63H 27/12
See application file for complete search history.

(56) References Cited

U.S. PATENT DOCUMENTS

| | | | |
|---|---|---|---|
| 7,742,625 B2* | 6/2010 | Pilu | H04N 5/232 348/143 |
| 9,202,375 B2* | 12/2015 | Sampedro Diaz | G01C 21/3667 |
| 9,237,262 B2 | 1/2016 | Phillips et al. | |
| 9,712,730 B2 | 7/2017 | Phillips et al. | |
| 9,713,675 B2* | 7/2017 | Levien | A61M 5/20 |
| 2014/0247325 A1* | 9/2014 | Wu | H04N 5/23206 348/39 |

* cited by examiner

*Primary Examiner* — Frank Huang
(74) *Attorney, Agent, or Firm* — Volpe and Koenig, P.C.

(57) ABSTRACT

Described herein is a body camera, a method of operating a body camera, a system for a body camera, and methods and systems for configuring a body camera. The body camera may include a digital camera configured to capture video. The body camera may also include one or more sensors for sensing data about the environment experienced by the body camera. The body camera may also include a global positioning system (GPS) receiver. The body camera may also include a transceiver for streaming video and sensor data.

18 Claims, 10 Drawing Sheets

S4W Sentry Body Camera

Provide real-time HD/IR video communications link for instant awareness and visibility wherever you go.

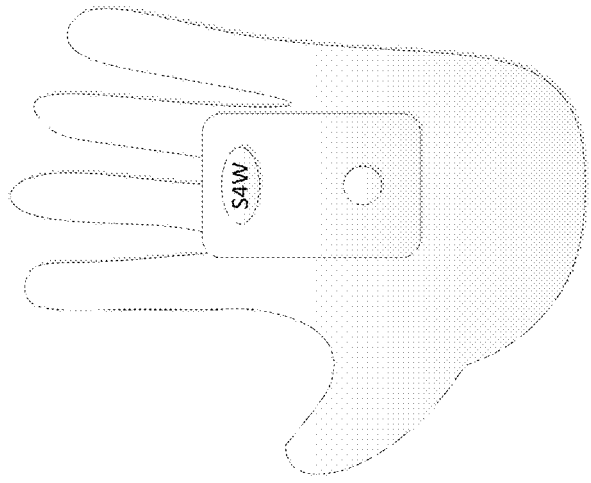

BODYCAM available in 3 levels

Level 1 Observer: Hi-res/SD record only
8 hour battery life

Level 2 Spotter: Hi-res/SD record/GPS
8 hour battery life

Level 3 Sentinel: Live streaming/Higher res/SD record/GPS
10-12 hour battery life No power? No network? No problem!

FIG. 13

BODY CAMERA

CROSS REFERENCE TO RELATED APPLICATION

This application claims the benefit of U.S. Provisional Application No. 62/093,807, filed Dec. 18, 2014, the content of which is hereby incorporated by reference herein.

FIELD OF INVENTION

The disclosure relates to an improved body camera including situational awareness capabilities.

BACKGROUND

Conventional digital body cameras are capable of recording high definition (HD) video and storing the video locally on a secure digital (SD) card. Conventional body cameras require a significant amount of operator interaction and maintenance to ensure that the body camera is capturing video when needed and further that the captured video is later backed-up. In a law enforcement setting, there is a need for a configurable body camera that can automatically record, maintain, store, and share important environmental and situational data.

SUMMARY

Disclosed herein is a new body camera. The body camera may include a digital camera and microphone for recording video and audio. The body camera may further include one or more sensors for detecting associated environmental and situational data experienced by the body camera. Sensors may include an inertial measurement unit (IMU), light sensor, microphone, etc. The body camera may further include a global positioning system (GPS) receiver for determining a location of the body camera. The body camera may further include local storage to buffer and store captured audio, video, GPS, and sensor data. The body camera may be configured to augment the captured audio and video data with time stamps, operator identification information, the GPS data, and the sensor data such that the audio and video data may be analyzed with contemporaneous location and sensor data. The body camera may further include one or more transceivers, such as a wireless transceiver, to communicate with a network to transmit the captured audio, video, GPS, and sensor data. The body camera may transmit captured data via the one or more transceivers to programmable recipients in response to conditions detected via the one or more sensors.

BRIEF DESCRIPTION OF THE DRAWINGS

FIG. 13 depicts example embodiments of a body camera implemented in accordance with the teachings herein.

DETAILED DESCRIPTION OF THE PREFERRED EMBODIMENTS

Figure 1:
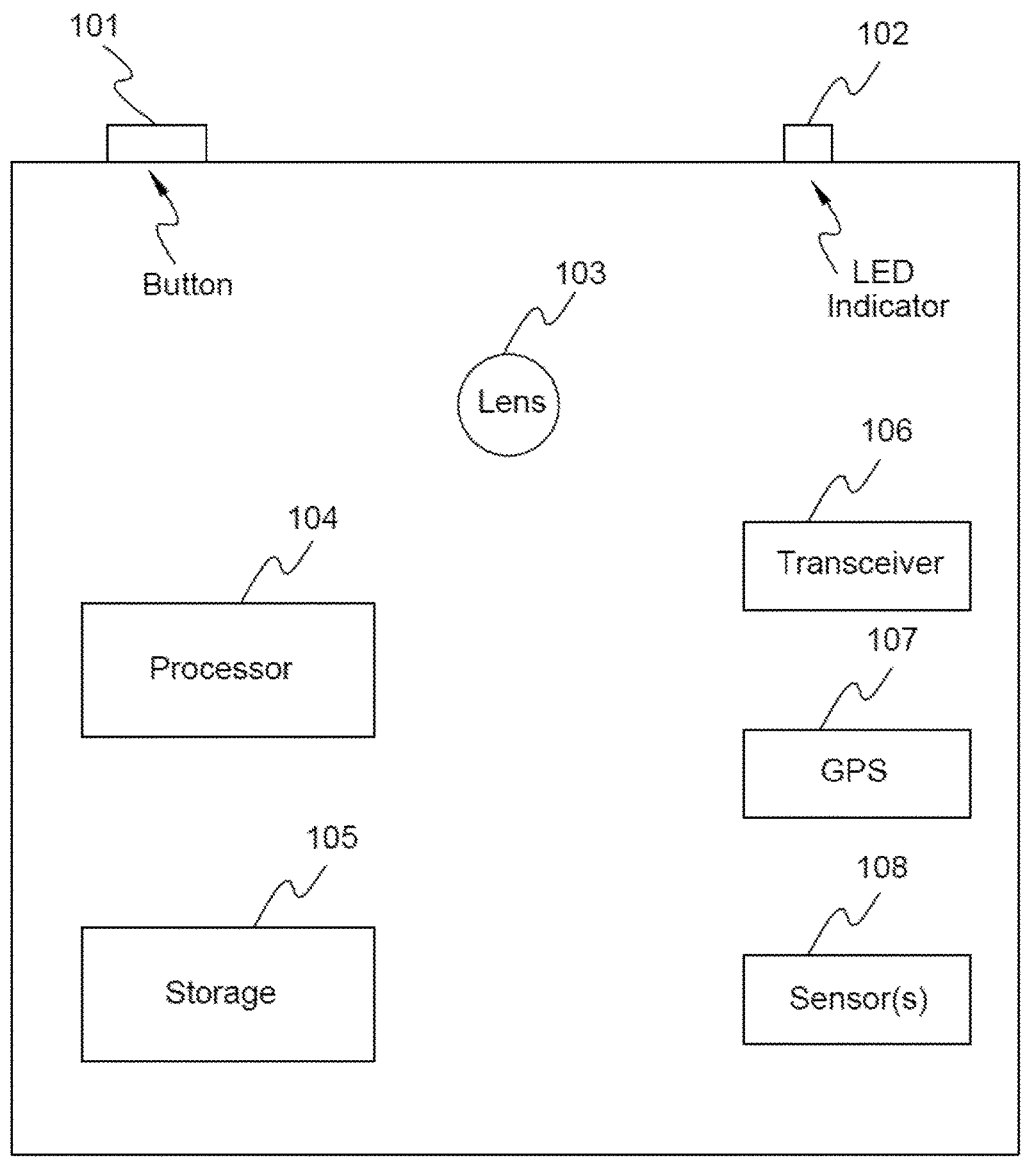
FIG. 1 depicts an example embodiment of a body camera.

An example embodiment of a body camera may include a digital camera capable of capturing a plurality of configurable resolutions including progressive scan and interlaced video such as progressive scan 1280×720 video also known as 720p, interlaced 1920×1080 high definition (HD) video also known as 1080i, progressive scan 1920×1080 HD video also known as 1080p, 3840×2160 or 4096×2160 video also known as ultra HD (UHD) or 4 k video. The digital camera may capture video in a video compression format such as, by way of example, H.263, H.264, H.265, motion picture experts group (MPEG)-4 Part 10, Advanced Video Coding (MPEG-4 AVC), MPEG-2, and MPEG-4 Part 2. The frames per second (fps) rate at which the video is recorded and encoded may also be configurable. An embodiment of a body camera may further include two lenses to reproduce a biopic field of view and to further improve a frame of view to extend beyond 180 degrees. A single interchangeable lens may be able to achieve a frame of view of approximately 15-180 degrees. Further, the body camera may be configured to have up to 360 degrees of field of view. When referred to herein, a video, encoded video, video stream, video feed, or any other reference to a form of video may include audio data, which may be captured via a microphone, in addition to the visual data.

An example embodiment of the body camera may include one or more transceivers to communicate with external communication systems. For example, the body camera may include cellular radio circuitry, such as a wireless transceiver, configured to interface with a cellular network via wideband code division multiple access (CDMA), time division multiple access (TDMA), frequency division multiple access (FDMA), orthogonal FDMA (OFDMA), single-carrier FDMA (SC-FDMA), and the like.

An embodiment of a body camera may support radio technology such as Universal Mobile Telecommunications System (UMTS) Terrestrial Radio Access (UTRA), which may establish an air interface using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The body camera may additionally or alternatively support a radio technology such as Evolved UMTS Terrestrial Radio Access (E-UTRA), which may establish an air interface using Long Term Evolution (LTE) and/or LTE-Advanced (LTE-A). The body camera may additionally or alternatively support radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. An embodiment of a body camera may further include a subscriber identity module (SIM) card to enable communication on the cellular network.

An embodiment of a body camera may further include circuitry, for example a Wi-Fi transceiver, configured to communicate via one or more versions of an Institute of Electronic and Electrical Engineers (IEEE) 802.11 standard. An embodiment of a body camera may additionally or alternatively include a Bluetooth-compatible transceiver configured to communicate with a paired Bluetooth device. An embodiment of a body camera may further include circuitry configured to communicate via any suitable wireless standard or protocol.

An embodiment of a body camera may further include circuitry configured to communicate via a port that supports a universal serial bus (USB) protocol. An embodiment may transfer data via a USB 1.0, USB 2.0 or USB 3.0-compatible port, update firmware and configurations, and may charge an internal battery via the USB port. An embodiment may alternatively or additionally include other serial communication ports such as one compatible with IEEE standard 1394 also known as FireWire®, a Thunderbolt®-compatible port, and/or any other communication port suitable for transferring data via a wired interface and/or charging the battery of the body camera via the wired interface. A wired communication port may connect a body camera to a separate expansion pack which may include, for example, additional, expandable storage, further wireless and/or wired communication circuitry, one or more additional batteries, and/or additional sensors for sensing associated environmental and situational data. The expansion pack may enable the use of a stripped-down body camera with minimal capabilities supported within the housing of the body camera, with the additional, configurable capabilities supported within the expansion pack.

An embodiment of a body camera may further include circuitry for charging an internal battery via inductive charging. Energy from an inductive charging pad may be transferred wirelessly through an inductive coupling to charge the internal battery. A body camera may further include charge monitoring circuitry to monitor the rate of charge and the amount of charge remaining. A body camera may include, for example, a 3.7V battery with 2,000 mAH. A body camera may use a higher voltage battery or a lower voltage battery and may further include one or more expandable battery packs. A body camera may also incorporate the use of a hydrogen, or other technology, fuel-cell for an extended battery life that may exceed 24 hours. A body camera may alternatively or additionally include a silicon-based battery for longer run time and/or longer battery lifetime.

An embodiment of a body camera may further include one or more sensors for further sensing situational/environmental data. Examples of sensors may include a light sensor, a microphone, an inertial measurement unit (IMU), an accelerometer, a humidity sensor, a temperature sensor, a flex sensor, and/or any other sensor to detect conditions and event data occurring in the vicinity of the body camera. As referenced above, any one or more of the sensors may be housed within the body camera or within the expansion pack.

An embodiment of a body camera may be further configured to perform intelligent detection and identification. A body camera may include settings for enabling one or more detection and/or identification features. For example, a body camera may be configured to detect and/or recognize license plates. An embodiment of a body camera may include settings to automatically recognize license plates and determine the characters present on the license plate. An embodiment of a body camera may be further configured to perform iris scanning and to identify a person based on the iris scan. Additionally or alternatively, a body camera may be configured to perform facial recognition. Additionally or alternatively, a body camera may transmit video data or information based thereon to a suitable device so that the suitable device may, in conjunction with the body camera or independently of the body camera, identify a corresponding license plate or person. The suitable device may transmit identification information to the body camera. Detection and/or identification capabilities may not be limited to the aforementioned examples and may further include any text or object recognition. For example, street signs and/or building addresses may be recognized as well.

An embodiment of a body camera may be further configured to perform voice recognition. A body camera may include embedded support for voice recognition and may activate commands in response to recognized voice commands. Additionally or alternatively, a body camera may relay voice information to a suitable external device to facilitate voice recognition.

An embodiment of a body camera may further include circuitry configured to determine a location of the body camera. A global positioning system (GPS) receiver may be implemented for determining an x, y, and z coordinate for the body camera that may correspond to the latitude, longitude, and altitude of the body camera. GPS data may be used by geographical information systems (GIS) to analyze and map the GPS data. An embodiment of a body camera may also incorporate geo-fencing (geofencing), a software feature that uses global position system (GPS) and radio frequency identification (RFID) to define and detect geographic boundaries.

An embodiment of a body camera may further include data storage for storing recorded audio, video, GPS, sensor data, and any other suitable data or metadata. The body camera may include embedded storage and/or the body camera may include a secure digital (SD) card slot, mini SD card slot, and/or a micro SD card slot with the appropriate corresponding card. The type of storage device should not be limited to the above examples but may include any suitable data storage device. As referenced above, the storage may be provided within the housing of the body camera or may additionally or alternative be housed within an optional expansion pack. An example embodiment of a body camera may be further configured to stream video and other data to another storage. For example, on a condition the body camera detects that it is connected to a network or device with available storage space, the body camera may prefer to stream the video and other data to the storage available via the network connection. For instance, a body camera may prefer to stream video and other data to a hard drive in a patrol car when connected to the patrol car via Bluetooth. The body camera may choose to stream the video and other data to the hard drive of the patrol car when it is determined that the internal storage is running low or no further storage is available.

An embodiment of a body camera may further include a central processing unit (CPU) which may be implemented as an embedded processor core in a microcontroller. The CPU may be configured via software to control the behavior of the body camera. The CPU may be implemented, for example, as an ARM® processor.

An embodiment of a body camera may further include one or more buttons for activating/deactivating features of the body camera. A button may actuate a tactile switch by tapping the button. The tactile switch may signal different commands to the body camera based on a short press, a press and hold, a double-click, or any other combination of pressing or clicking patterns. The body camera may additionally or alternatively include a keypad and/or touchscreen.

An embodiment of a body camera may further include one or more indicators, for example LEDs, to provide feedback to the user of the body camera. For example, an LED may turn green when live video is being recorded, and the LED may be red when live video is not being recorded. An LED may additionally or alternative blink, flash in a particular pattern, or alternate colors in a particular pattern to indicate feedback on the operation of the body camera.

An embodiment of a body camera may further include a speaker or audio transducer for providing audible feedback. A speaker/transducer may play different tones or series of tones to provide status feedback.

An embodiment of a body camera may also be configured to use a speaker/transducer in conjunction with a microphone to enable two-way audio. A body camera may receive audio signals via the microphone and may transmit the audio signals to a suitable recipient, such as to a police station and/or another body camera. The body camera may further receive audio from the suitable recipient and/or another body camera and play the audio via the speaker/transducer. A body camera may include adjustable settings to configure the body camera to receive audio from selected devices and transmit audio to selected devices. A body camera may be configured to receive audio from the same devices or different devices than the devices that may receive audio from the body camera.

The above described components may be operatively coupled to each other to enable a body camera to flexibly, configurably, and automatically collect, record, store, share, and maintain sensed data via the various inputs and recording components and devices implemented in the body camera. The combination of components may be configured to provide automatic, low-maintenance support in a surveillance or law enforcement environment. The following are examples of configurations of the body camera that may have significant benefits to surveillance and law enforcement.

An embodiment of a body camera is depicted in FIG. 1. The example body camera 100 may include one or more buttons 101. The one or more buttons 101 may be used to signal, for example, starting/stopping recording and/or streaming of video. The one or more buttons 101 may additionally or alternatively be used to indicate panic to alert, for example, a responder at a police station. The body camera 100 may further include one or more LED indicators 102. The one or more LED indicators 102 may indicate one or more modes of operation of the body camera 100. The body camera 100 may further include a lens/digital camera subunit 103 used to capture video data. The body camera 100 may further include a processor 104 and storage 105. The storage 105 may be used to store settings and/or may be used to buffer received video and sensor data. The body camera 100 may further include a transceiver 106 to receive and transmit information. The body camera 100 may further include a GPS receiver 107 for determining a location of the body camera 100. The body camera 100 may further include one or more sensors 108 to sense environmental data. The example depiction of the body camera 100 in FIG. 1 is not meant to be limiting. The body camera 100 may include additional hardware and functionality.

Figure 2:
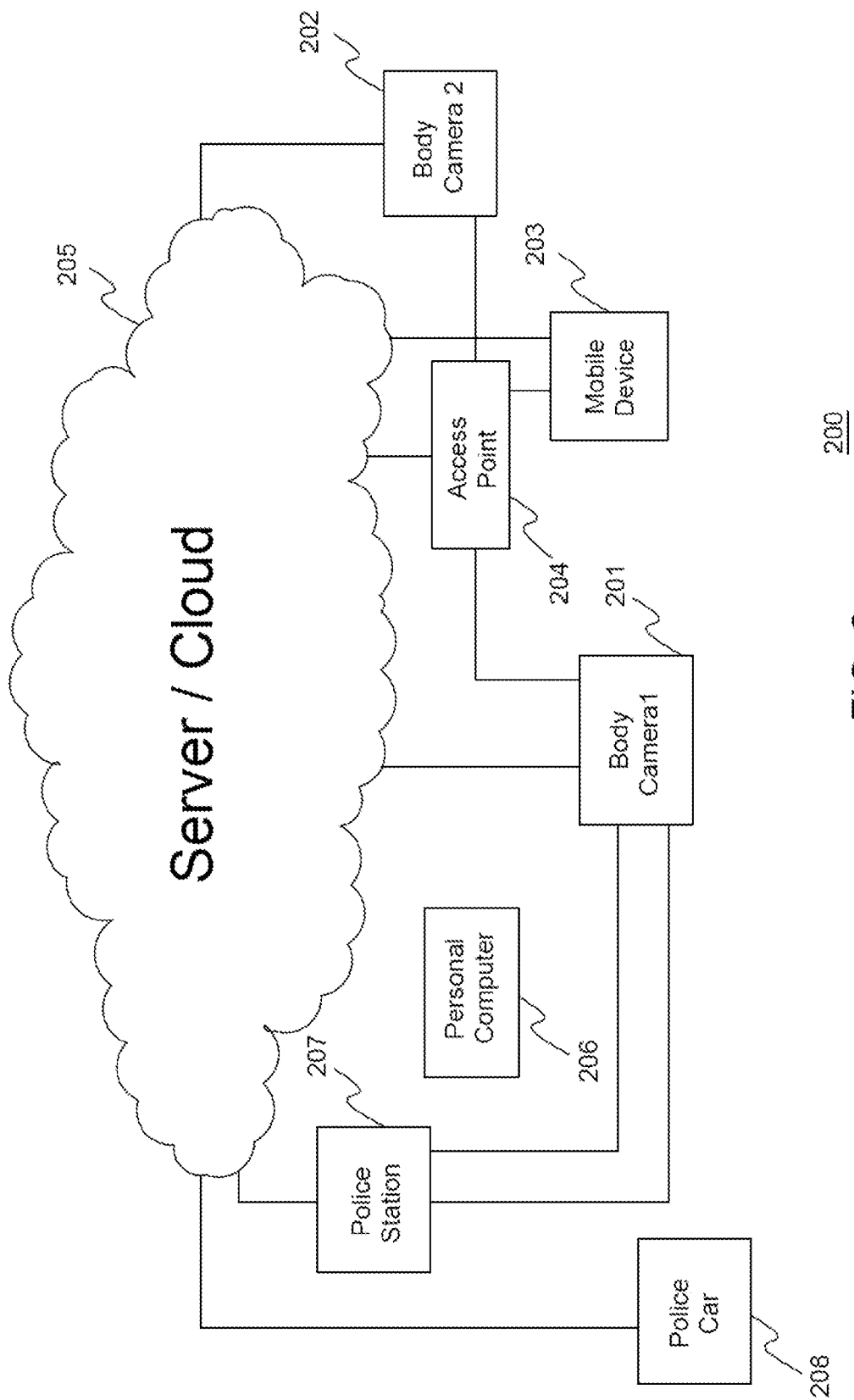
FIG. 2 depicts an example embodiment of a system including a body camera configured in accordance with the description herein.

FIG. 2 depicts an embodiment of a system that may enable a body camera to stream and back-up live video in accordance with the description herein. The system 200 may include one or more body cameras such as a first body camera 201 and a second body camera 202. The first body camera 201, for example, may be connected to a server/cloud 205, and/or may be connected with a police car 208, and/or an access point 204, and/or a police station 207. A second body camera 202, for example, may be connected to the server/cloud 205 and/or an access point 204. The access point 204 may be one or more access points. The access point 204 may be any combination of a Wi-Fi access point, a cellular base station, or any other wireless device and may be co-located or may be embodied by multiple distinct entities in different locations. The access point 204 may provide a connection to the server/cloud 205. One or more mobile devices 203 may be connected to the server/cloud 205 and/or the access point 204. The mobile device may be a mobile phone, smart phone, tablet, or any other wireless or wired device. The police car 208 may include, for example, a Wi-Fi, cellular, or Bluetooth hotspot that may connect to the first body camera 201, may also connect to the server/cloud 205, and may also connect to the police station 207. The police station 207 may include a server and/or other wireless and/or wired transceivers to connect to other devices authorized to be in communication with the police station 207. The police station may be connected to the server/cloud 205. A personal computer 206, such as a laptop, desktop, tablet, or any other computing device, may also be connected to the server/cloud 205.

A body camera may be configured with one of a plurality of different profiles to govern the behavior and capabilities of the body camera. In an embodiment of a body camera, settings of a profile may be chosen so that the body camera operates in such a way so that the battery lasts for 8 hours, 12 hours, 24 hours, etc. For example, a body camera may be configured via a profile with lower resolution video encoding and to power down its cellular transceiver to extend the battery life to 24 hours. In another example, the body camera may be configured via a profile corresponding to an 8 hour battery life which sets the camera to record at the highest resolution and to transmit data via any available wireless connection. Additionally or alternatively, a plurality of profiles may be available, each of which are suited for a particular use. For example, a profile may configure a body camera with particular settings best suited for a patrol officer out for traffic law enforcement. A different profile may configure a body camera for use by a university police officer on campus patrol. Further examples include profiles suited for an officer on foot versus in a car, or plain clothes officers versus uniformed officers.

Figure 3:
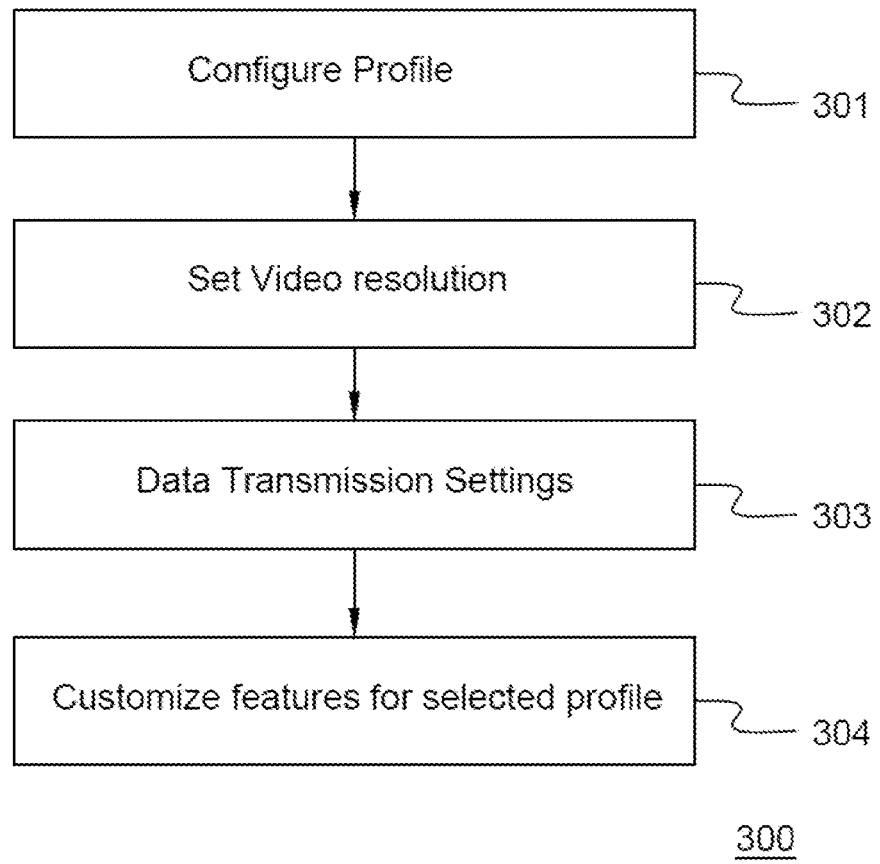
FIG. 3 depicts an example method for configuring a body camera.

FIG. 3 depicts an example method 300 for configuring a body camera. At 301, a body camera may be configured with a profile. A profile may be, for example, a police officer profile, a campus police profile, a firefighter profile, etc. At 302, a video resolution to be recorded and/or streamed may be set in accordance with the selected profile. A video resolution for recording may be the same as or different than a video resolution for streaming. At 303, one or more data transmission settings may be configured. Data transmission settings may include, for example, preferred radio access technology, such as Wi-Fi, LTE, HSPA, etc., via which to transmit, transmission speed, wireless carrier, etc. At 304, features for the selected profile 304 may be customized. For example, whether video is always recorded and/or streamed and the functionality of the body camera in response to a button press may be configured. The examples provided should not be construed as limiting. The body camera may be configured in accordance with any of the description provided herein.

The steps depicted in FIG. 3 should not be construed as limiting the particular order in which the example method 300 must be executed. Steps may be performed in a different order. Moreover, the example method 300 should not be limited to necessarily including all steps depicted. Steps may be removed from the method 300. Steps depicted as separate steps in FIG. 3 may also be combined or split into further separate steps.

An embodiment of a body camera may be configured to provide an automatic live streaming feed of the video being captured by the body camera. The live video feed may be shared via a wired or wireless transceiver such as any of those described above to share the live video feed with one or more configurable recipients. For example, a captured live video feed may be streamed from a police officer out on patrol back to his/her police station so that his/her activities may be remotely monitored. The body camera may be configured so that an appropriate wireless connection may be selected based on a set of preconfigured rules to transmit the live video feed. For example, the body camera may be configured with rules such that the wireless connection able to support the highest data rate may be given highest priority for selection. Additionally or alternative, the security of the particular wireless connection may be considered such that an insecure connection may be avoided unless there is no other connection available or may be completely prohibited for use. Additionally or alternatively, a wireless network may be selected based on a determined location of the body camera.

An embodiment of a body camera may be configured to select one or more network connections and may direct particular data via a particular connection. For example, a body camera may detect a Bluetooth connection with a paired automobile Bluetooth system and an LTE cellular connection. The body camera may determine to transmit a high resolution version of a video feed via the Bluetooth connection and may determine to transmit a low resolution version of the video feed via the LTE cellular connection, or vice versa. As another example, a body camera may transmit sensor data only via an available cellular connection but may transmit all data including both sensor data and video feed via an authorized Wi-Fi connection. A body camera may be configured to determine a network connection to use based on altitude. For example, via GPS data, the body camera may determine that it is located underground and may select a Wi-Fi connection based on said determination.

Figure 4:
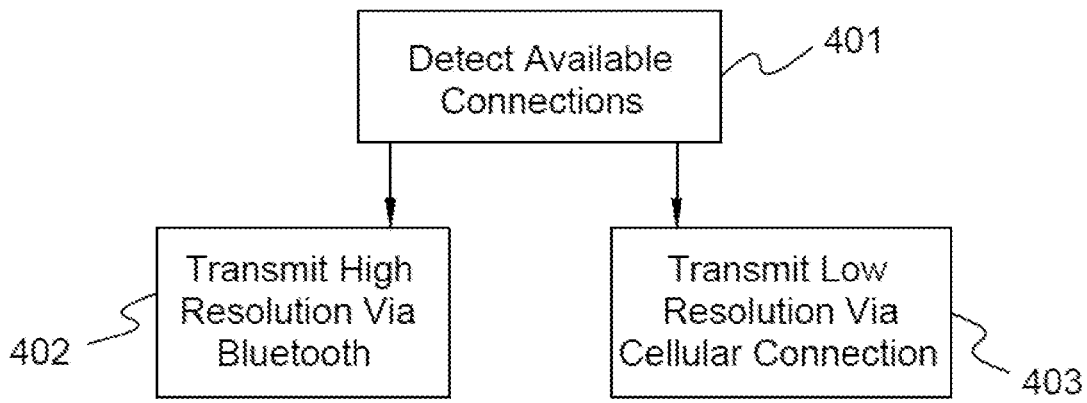
FIG. 4 depicts an example method for execution by a body camera.

FIG. 4 depicts an example method 400 that may be performed by a body camera. A body camera may detect available connections at 401. For example, the body camera may detect a Bluetooth connection and a cellular connection. The body camera may transmit a high resolution version of captured video at 402, and/or may transmit a low resolution version of captured video at 403.

The steps depicted in FIG. 4 should not be construed as limiting the particular order in which the example method 400 must be executed. Steps may be performed in a different order. Moreover, the example method 400 should not be limited to necessarily including all steps depicted. Steps may be removed from the method 400. Steps depicted as separate steps in FIG. 4 may also be combined or split into further separate steps.

An embodiment of a body camera may provide a live video feed in response to a button being depressed by a wearer of the body camera. For example, a police officer may press a button on the body camera when he/she wishes to share a live stream of the video being recorded. Additionally or alternatively, the live video stream may be stopped from recording locally and/or streaming in response to the officer pressing a button on the body camera.

Figure 5:
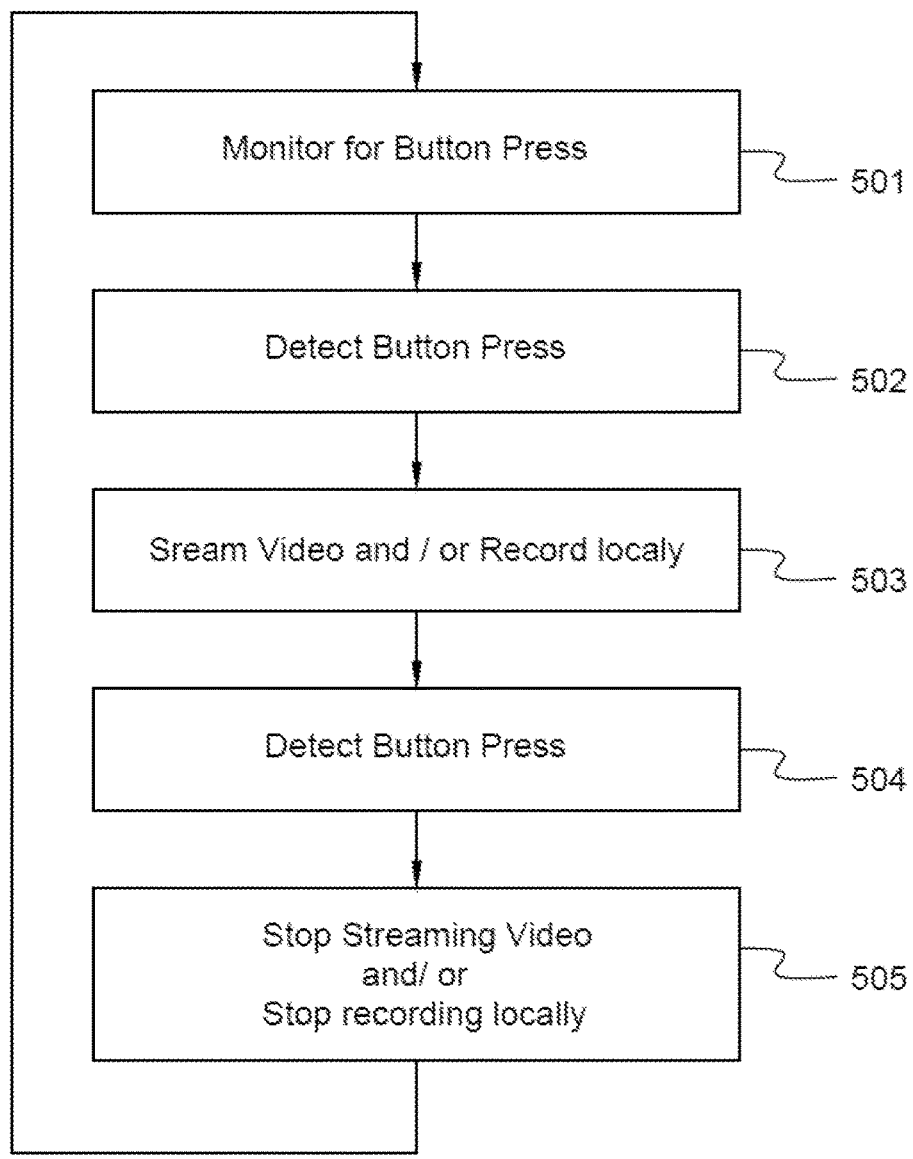
FIG. 5 depicts another example method for execution by a body camera.

FIG. 5 depicts an example method 500 that may be performed by a body camera. At 501, the body camera may monitor for a button press. At 502, the body camera may detect a button press. At 503, the body camera may stream video and/or record video locally in response to the button press. At 504, the body camera may detect another button press. At 505, the body camera may stop streaming the video and/or may stop recording the video locally.

The steps depicted in FIG. 5 should not be construed as limiting the particular order in which the example method 500 must be executed. Steps may be performed in a different order. Moreover, the example method 500 should not be limited to necessarily including all steps depicted. Steps may be removed from the method 500. Steps depicted as separate steps in FIG. 5 may also be combined or split into further separate steps.

An embodiment of a body camera may dynamically configure the video codec and camera based on a speed of the employed network connection. For example, on a condition the body camera is communicating via a high speed network, the body camera may dynamically adapt the resolution of the video such that it is captured and encoded in HD because the network connection can support the data throughput necessary to stream the encoded video. When the network connection degrades or the body camera is connected via a lower speed connection, the body camera may dynamically down-sample the resolution such that the associated data may be reliably streamed via the network connection. The body camera may also be configured to capture still frames in lieu of a video feed when experiencing low speed network conditions. The body camera may further buffer and store the video locally until a network connection is available or restored. A body camera may locally store a full resolution video feed while streaming a lower resolution video feed based on the experienced speed of a network connection.

Figure 6:
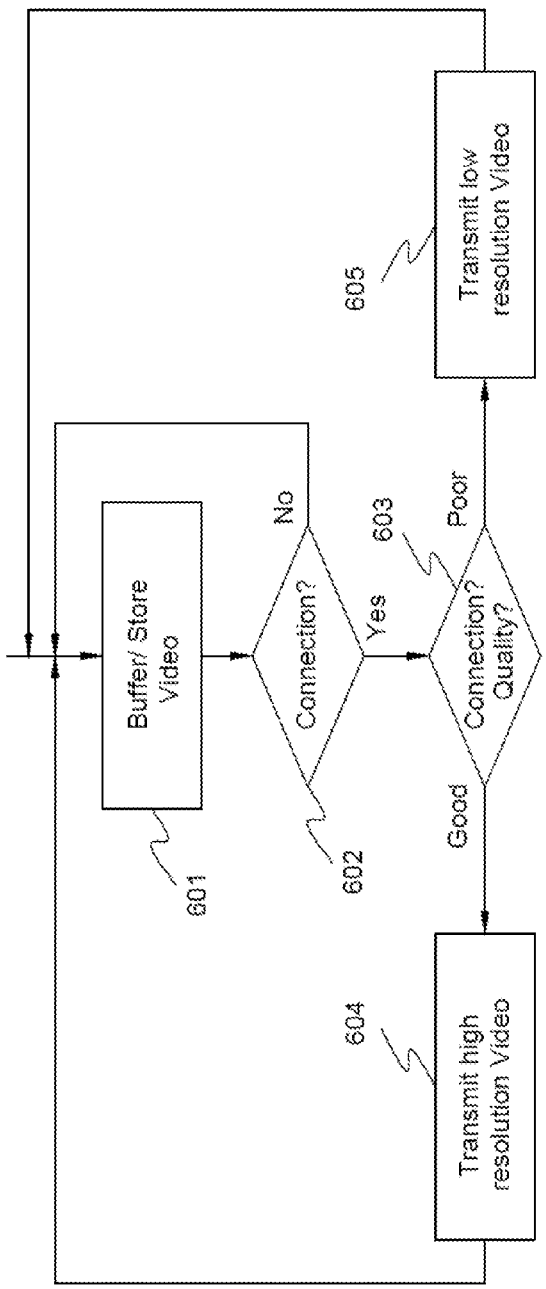
FIG. 6 depicts another example method for execution by a body camera.

FIG. 6 depicts an example method 600 that may be performed by a body camera. At 601, the body camera may buffer/store captured video and/or sensor data. At 602, the body camera, for example via a transceiver, may determine whether the body camera has a wireless connection. If the body camera does not have a wireless connection, the body camera may return to 601 to continue to buffer/store video and/or sensor data. If the body camera does have a wireless connection, the body camera may, at 603, determine a quality level of the wireless connection. If the quality of the wireless connection is above a threshold such that the wireless connection quality is determined to be good, the body camera may, at 604, transmit the video at high resolution possibly along with the sensor data. If the quality of the wireless connection is below the threshold such that the wireless connection quality is determined to be poor, the body camera may, at 605, transmit the video at a low resolution possibly along with the sensor data. The body camera may also compare the quality to a plurality of thresholds and transmit the video at one of a plurality of corresponding resolutions depending on the quality of the connection. The body camera may also transmit the video via a plurality of connections at a resolution appropriate for the corresponding connection.

The steps depicted in FIG. 6 should not be construed as limiting the particular order in which the example method 600 must be executed. Steps may be performed in a different order. Moreover, the example method 600 should not be limited to necessarily including all steps depicted. Steps may be removed from the method 600. Steps depicted as separate steps in FIG. 6 may also be combined or split into further separate steps.

An embodiment of a body camera may listen for a particular wireless network, for example by searching for a particular service set identifier (SSID). When the body camera identifies the SSID, the body camera may then automatically upload data from a local storage device to free up space on the local storage device. For example, the body camera may upload the data to a configurable location that may be specified by an Internet Protocol (IP) address. Additionally or alternatively, data may be uploaded to a file transfer protocol (FTP) server and/or a particular folder of the FTP server. Additionally or alternatively, data may be uploaded to a cloud server. The data may be sorted and stored based on information gathered from sensor data. For example, the video stream may be stored by location in which it was recorded based on associated GPS data. For instance, the video feed may be stored based on one or more neighborhoods in which the video was recorded.

Figure 7:
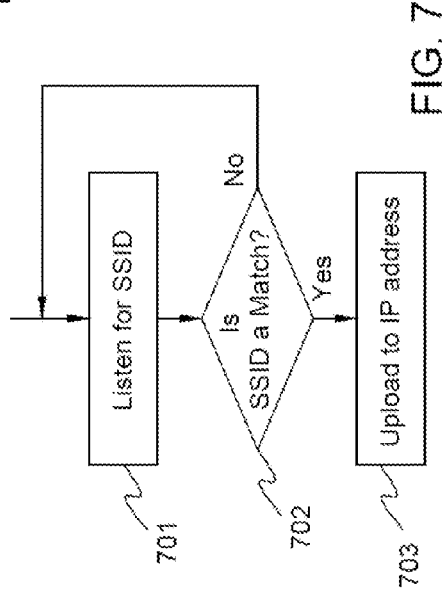
FIG. 7 depicts another example method for execution by a body camera.

FIG. 7 depicts an example method 700 that may be performed by a body camera. At 701, the body camera may listen for an SSID associated with a particular wireless connection. At 702, the body camera may determine if a found SSID matches a preferred or authorized SSID. If the SSID is not a match, the body camera may return to 701 to continue to listen for an SSID. If the SSID is a match, at 703, the body camera may upload video possibly augmented with sensor information to a selected IP address.

The steps depicted in FIG. 7 should not be construed as limiting the particular order in which the example method 700 must be executed. Steps may be performed in a different order. Moreover, the example method 700 should not be limited to necessarily including all steps depicted. Steps may be removed from the method 700. Steps depicted as separate steps in FIG. 7 may also be combined or split into further separate steps.

In a law enforcement environment, the body camera may be configured to automatically upload the recorded data once the body camera detects that the police officer has returned to the police station. This may be accomplished by listening for an SSID corresponding to the police station's network. Additionally or alternatively, the body camera may detect it is within the vicinity of the police station via GPS coordinates and a geofence established for the police station. Alternatively, instead of automatically uploading the video when the body camera returns to the police station, the body camera may be automatically capable of uploading, but will wait to start uploading until a button is manually pressed to initiate transfer or the officer otherwise instructs the body camera to start uploading.

An embodiment of a body camera may be configured to initiate streaming of its video feed via a remote trigger. A body camera may be remotely triggered to stream its video feed back to the entity responsible for triggering the stream or may be instructed to stream the video feed to one or more other or additional recipients. For example, a trigger may be sent from a server at a police station to begin streaming the video feed back to the police station. The video feed may be additionally streamed to all officers within a particular radius or vicinity of the triggered body camera based on associated GPS data. This may prove useful in a dangerous scenario wherein it may be beneficial to stream the video feed of the officer wearing the body camera to other officers in the vicinity. A body camera may also operate in a "high alert" mode based on a location of the body camera. In a high alert mode, the body camera may be configured to share video and other data at a higher resolution and rate. For instance, a body camera may be configured such that when the body camera detects it has entered a geofence associated with a dangerous or high crime rate area, the body camera may automatically stream the video feed and frequently transmit all recorded data to all available and/or authorized recipients such that the safety of an officer wearing the body camera is improved. Additionally or alternatively, the body camera may stream to all other officers within the same geofence.

Additionally or alternatively, the wearer of the body camera may press a button or initiate some other trigger locally on the body camera to begin streaming the video feed back to a police station or to one or more others within a configurable vicinity of the wearer. In an embodiment of a body camera, pressing of a panic button may set up a geofence which may be shared such that all authorized recipients within the geofence receive a stream of the video feed. Triggering the streaming of the video feed may also be accompanied by an alert to the respective recipients. In one example, the video feed may be shared via short message service (SMS). The SMS message may include an alert and a link to the streaming video feed. The streaming video feed may be viewed via a web browser, smartphone app, or any suitable application to display the streaming video.

Figure 8:
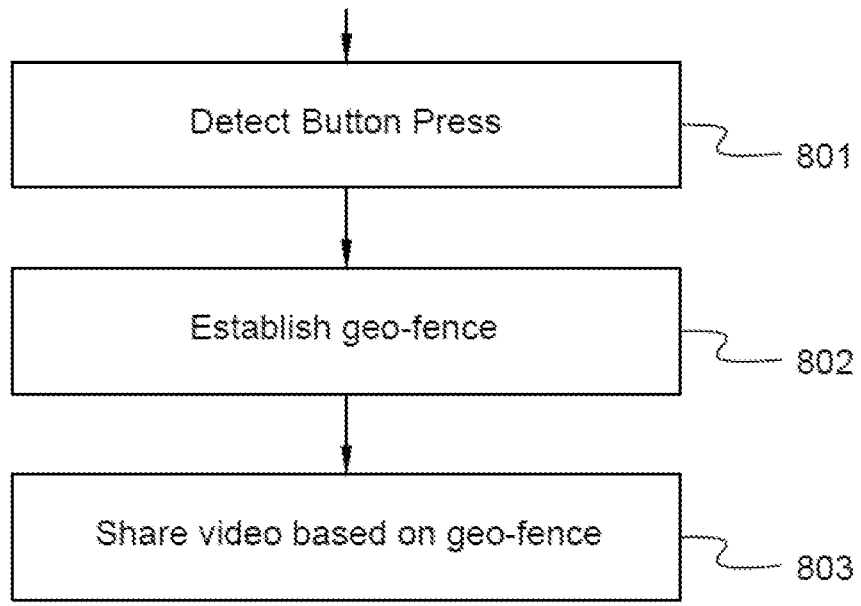
FIG. 8 depicts another example method for execution by a body camera.

FIG. 8 depicts an example method 800 that may be performed by a body camera. At 801, the body camera may detect a button press. At 802, the body camera may establish a geo-fence based on, for example, a current position of the body camera based on GPS data. At 803, the body camera may share the video possibly augmented with sensor information based on the geo-fence. For example, The video may be shared to other authorized recipients within the geo-fence or within a certain distance of the geo-fence or within a certain distance of the body camera.

The steps depicted in FIG. 8 should not be construed as limiting the particular order in which the example method 800 must be executed. Steps may be performed in a different order. Moreover, the example method 800 should not be limited to necessarily including all steps depicted. Steps may be removed from the method 800. Steps depicted as separate steps in FIG. 8 may also be combined or split into further separate steps.

An embodiment of a body camera may be configured to stamp a video feed with identification information and data captured by sensors and other data capturing devices incorporated in the body camera, connected to the body camera, or in communication with the body camera. A processor in the body camera may receive sensor inputs and stamp the video feed such that additional environmental and situational information may be included along with the video feed. The video feed characteristics (font, size, screen location) may also be adjusted via software configuration. Such information may include GPS coordinates, a time stamp, a status of an IMU that may detect whether an impact or sudden force has been experienced, a light sensor reading that may detect whether a flash of light occurred, for instance a flash of light associated with gunfire, and any other sensor readings. As yet another example, a body camera may detect via its microphone whether a loud noise that may be associated with gunfire was detected. Identification information may include an officer ID. For example, the officer ID may be a combination of the officer's name and badge number. Additionally or alternatively, the identification information may identify the body camera used to capture the video, sensor data, etc. For example, a body camera may be shared amongst a plurality of officers by registering the particular officer using the body camera during a particular shift. In this way, the video feed may be augmented with additional information from the sensor data marking at corresponding times within the video feed when the sensor data was measured. Additionally or alternative, the sensor data may be recorded at regular intervals along with an associated time stamp which may be matched with a corresponding time stamp of the video feed. The augmented video stream may then be used to determine when certain events indicated by the sensor data occurred in relation to the captured video feed. Additionally or alternatively, the video feed may be selectively augmented with selected sensor data determined to correspond to an event, for example a gunshot.

Figure 9:
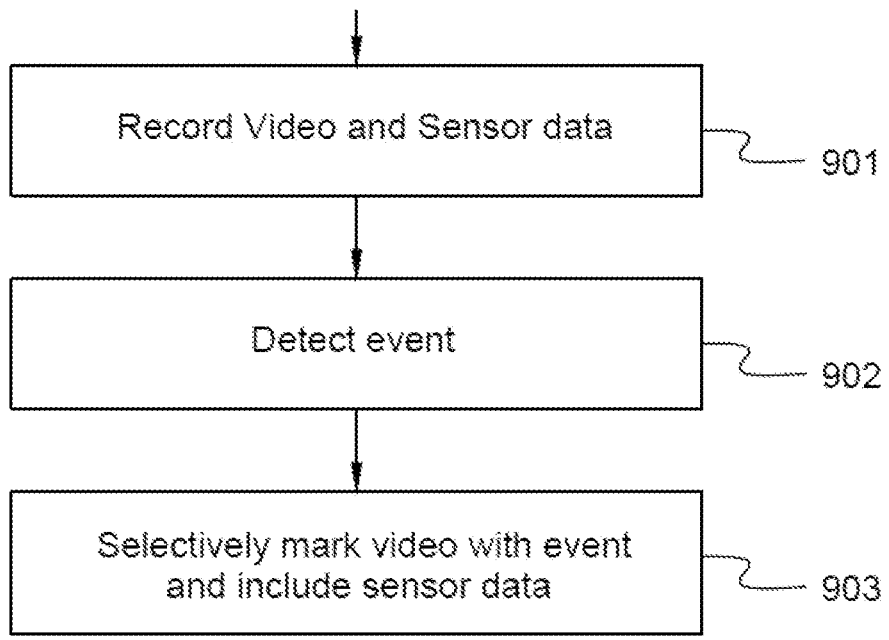
FIG. 9 depicts another example method for execution by a body camera.

FIG. 9 depicts an example method 900 that may be performed by a body camera. At 901, the body camera may record and/or stream video and sensor data. At 902, the body camera may detect an event. For example, the body camera may detect that the IMU sensor registered a value over an associated threshold signifying the wearer experienced a significant impact. At 903, the body camera may selectively mark the video with an indication of the significant impact event and include sensor data. The video may be marked with the event at the time at which the event was sensed and/or with a timestamp of when the event occurred.

The steps depicted in FIG. 9 should not be construed as limiting the particular order in which the example method 900 must be executed. Steps may be performed in a different order. Moreover, the example method 900 should not be limited to necessarily including all steps depicted. Steps may be removed from the method 900. Steps depicted as separate steps in FIG. 9 may also be combined or split into further separate steps.

The body camera may generate a "heartbeat" including the aforementioned information which may be streamed as a low-rate data stream. The heartbeat may be encoded into the video feed or it may be sent as a separate low-rate data stream. The heartbeat may be a text string of 255 or less characters, or any other character quantity, that may be regularly and periodically generated and transmitted out to authorized recipients. The heartbeat may regularly include data corresponding to all sensors, GPS data, etc. or may only include data that exceeds a threshold indicating a notable event transpired so as to reduce the amount of data transmitted that is not of interest.

An embodiment of a body camera may be further configured to transmit the heartbeat without the video stream during poor transmission conditions wherein the relatively higher demands for data throughput of the video stream may not be supported by the network connection being experienced. In such a scenario, the heartbeat data may still be able to provide a recipient with information from one or more sensors of the body camera. For example, GPS data may still be transmitted so that the body camera, and its wearer, may be located. The body camera may be configured to prioritize the data that is transmitted given present conditions. For example, a body camera may transmit GPS coordinates and a time stamp only when experiencing very poor communication conditions. As another example, a body camera may detect the remaining battery power and may prioritize which data to transmit based on a targeted remaining amount of time that the body camera is configured to operate.

Figure 10:
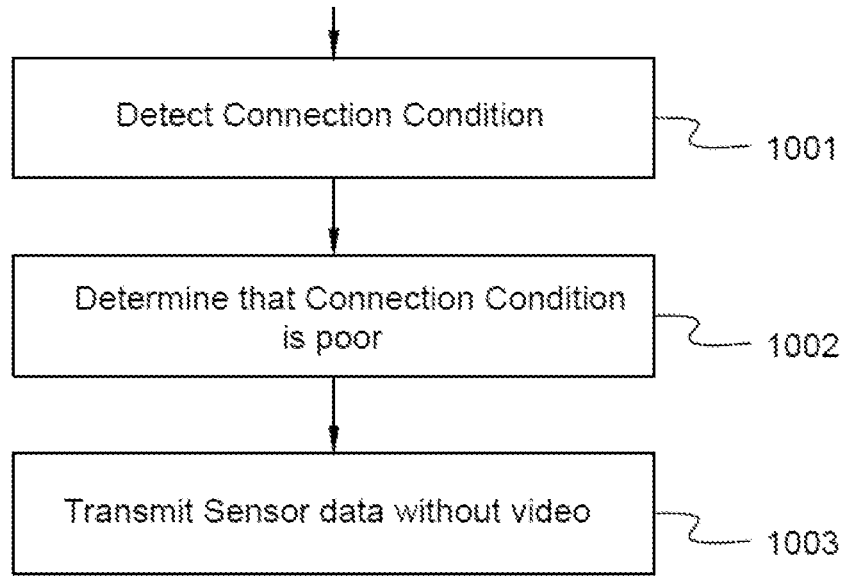
FIG. 10 depicts another example method for execution by a body camera.

FIG. 10 depicts an example method 1000 that may be performed by a body camera. At 1001, the body camera may detect, for example via a transceiver, a condition level of a current connection. At 1002, the body camera may determine that the connection condition is poor. At 1003, responsive to determining that the condition is poor, the body camera, via the transceiver, may transmit sensor data without video data. Alternatively, if the body camera determined that the connection condition was good, the body camera may transmit the video data along with the sensor data.

The steps depicted in FIG. 10 should not be construed as limiting the particular order in which the example method 1000 must be executed. Steps may be performed in a different order. Moreover, the example method 1000 should not be limited to necessarily including all steps depicted. Steps may be removed from the method 1000. Steps depicted as separate steps in FIG. 10 may also be combined or split into further separate steps.

An embodiment of a body camera may be further configured to transmit the heartbeat data with encryption to protect the sensor data from being intercepted and decoded by unauthorized recipients. In one embodiment, a PN code may be applied to encrypt the heartbeat data. The heartbeat data may be shuffled so that the heartbeat data is indecipherable to the unauthorized recipient.

An embodiment of a body camera may be configured to use an optimized video compression and a codec to save battery power. A codec may be designed to use lower power when a video is being buffered but not transmitted.

An embodiment of a body camera may be configured to locally buffer video throughout the entire time it is in operation. In this way, a body camera may be configured such that once a button is pressed or some other instruction is executed to command the body camera to stream video, the body camera may be able to reach back via the buffered video to the beginning of its operation, which may be significantly prior to when the streaming command was executed. In this way, the body camera may relieve a need to timely press a record and stream button on the body camera as the video is always being buffered. When the command to stream is executed, for instance through a button press, the buffered video may be marked with an indication of the button press and may then store the video with said indication.

An embodiment of a body camera may be configured to analyze the data and adjust operation based on the analysis. A body camera may analyze sensor data based on a set of programmed rules to determine environmental and situational indicators and events that may transpire. For example, a body camera may monitor the output from an IMU to determine whether the wearer of the body camera has been shot or attacked in some way. In one example, the processor of the body camera may determine whether the output of the IMU has exceeded a threshold. In response to determining the output of the IMU has exceeded its associated threshold, the body camera may automatically stream the video feed to one or more authorized recipients, may begin to automatically share GPS data, may transmit an alert to one or more authorized recipients, or any combination thereof. The processor may be configured to compare any sensor data to an associated threshold to determine whether a corresponding event has occurred and may mark the event via an indicator. In another example, the light sensor of the body camera may detect a flash of light. The processor of the body camera may analyze the flash to determine whether the flash of light corresponds to a gun shot. In response to determining a gun was fired, the body camera may automatically stream the video feed to one or more authorized recipients, may begin to automatically share GPS data, may transmit an alert to one or more authorized recipients, or any combination thereof. Additionally or alternatively, the sensor data may be transmitted to a remote server where the data may be analyzed to perform similar determinations as described above. By offloading the analysis of the data to a remote device, the body camera may save on battery life. The server or remote device may then remotely trigger the streaming of the video feed to the one or more authorized recipients. The body camera may be configured via a profile to set whether the data analysis is performed locally within the body camera, remotely at a server for instance, on a tethered expansion pack, or any combination thereof.

Figure 11:
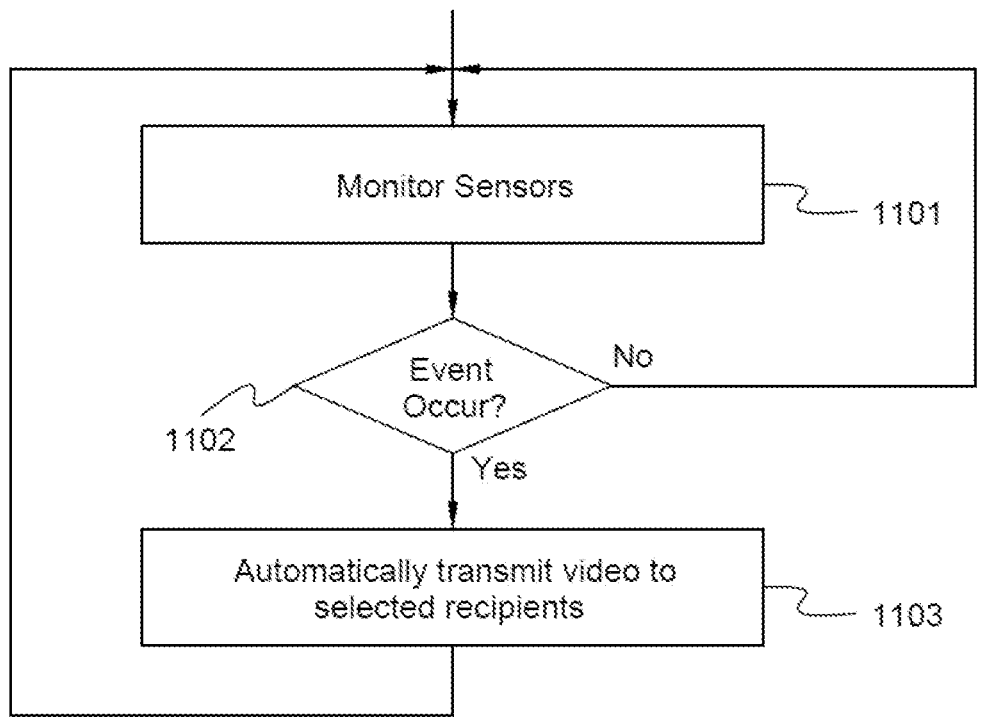
FIG. 11 depicts another example method for execution by a body camera.

FIG. 11 depicts an example method 1100 that may be performed by a body camera. At 1101, the body camera may monitor one or more sensors for sensed data. At 1102, the body camera may determine whether an event occurred in accordance with the methods described herein. If an event did not occur, the body camera may return to 1101 to monitor the one or more sensors. If the body camera determines that an event did occur, at 1103, the body camera may automatically transmit video and/or sensor data to selected recipients. The recipients, for example, may be certain pre-authorized recipients, may be authorized recipients within a certain radius of the body camera, and/or may be recipients within a same geo-fence as the body camera. The body camera may then return to 1101 to monitor the one or more sensors. The body camera may share video and/or sensor data to selected recipients based on the type of event that occurred. For example, if a button is pressed, video may only be shared with the police station, however, if a gunshot is detected, the video may instead be shared with all officers within a certain radius of the body camera. The radius may also be based on the type of event that occurred.

The steps depicted in FIG. 11 should not be construed as limiting the particular order in which the example method 1100 must be executed. Steps may be performed in a different order. Moreover, the example method 1100 should not be limited to necessarily including all steps depicted. Steps may be removed from the method 1100. Steps depicted as separate steps in FIG. 11 may also be combined or split into further separate steps.

Figure 12:
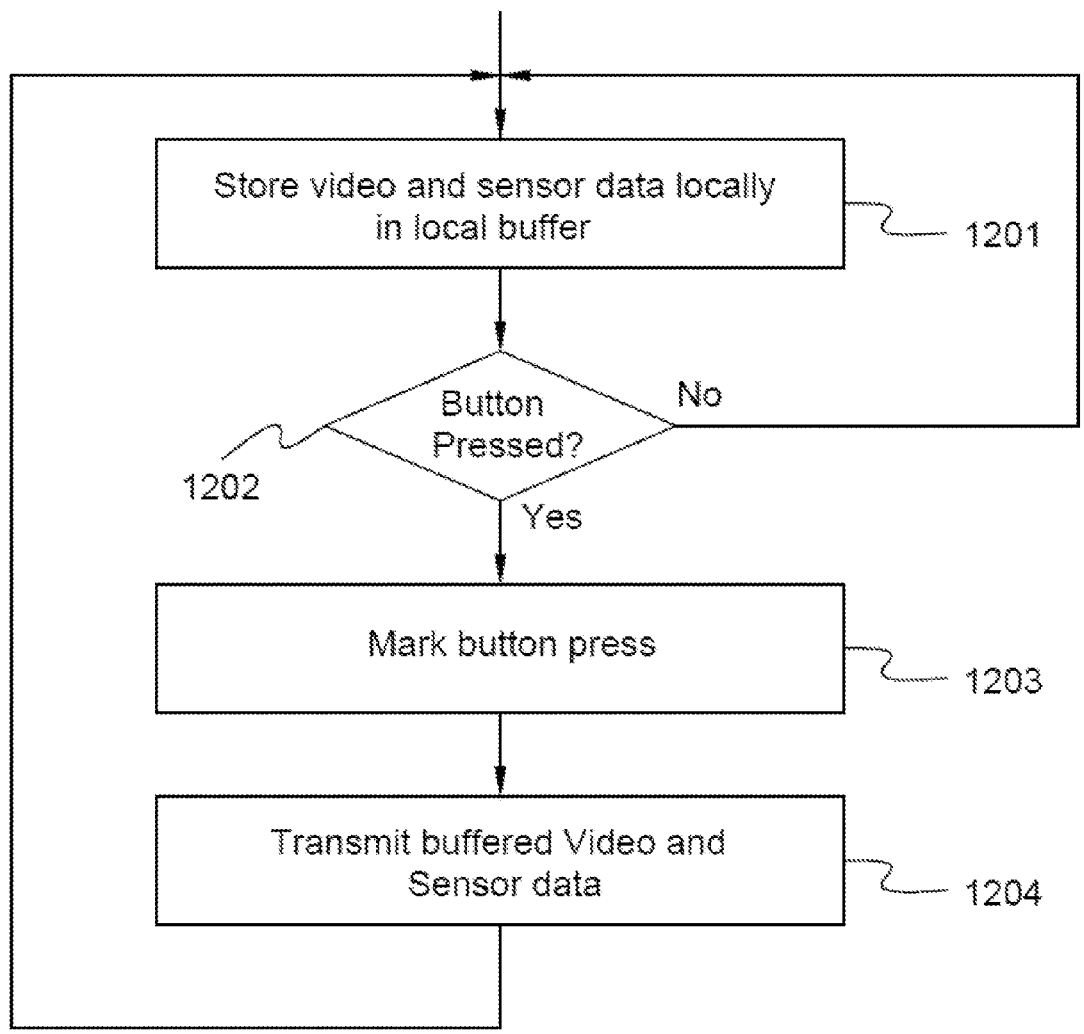
FIG. 12 depicts another example method for execution by a body camera.
Figure 14:
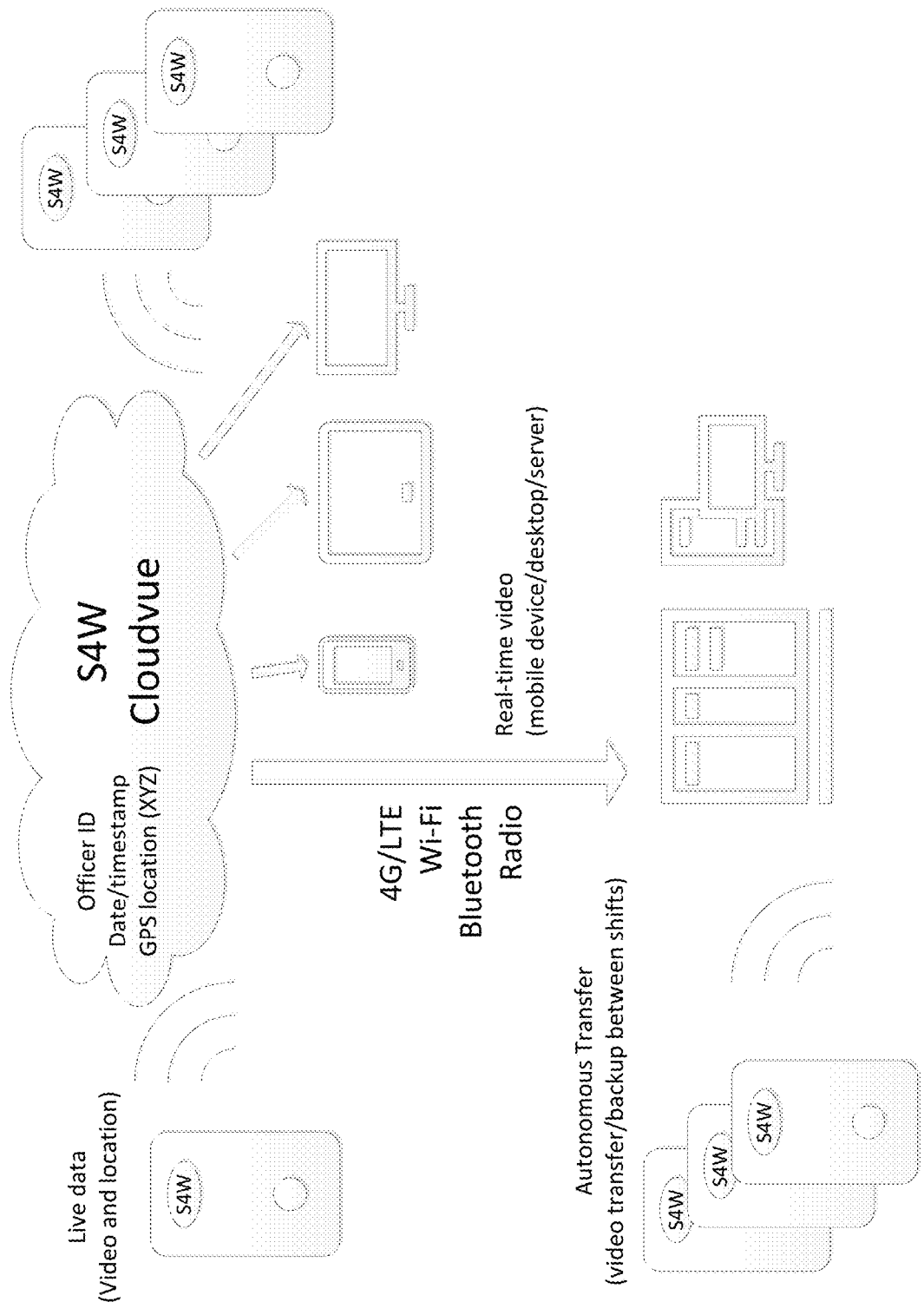
FIG. 14 depicts an example surveillance system incorporating a body camera implemented in accordance with the teachings herein.

FIG. 12 depicts an example method 1200 that may be performed by a body camera. At 1201, the body camera may store video and/or sensor data locally in a local buffer within the body camera. At 1202, the body camera may monitor for a button press. If a button has not been pressed, the body camera may return to 1201 to locally store video and/or sensor data. If a button has been pressed, at 1203, the body camera may mark the button press as an event and the time of the button press. At 1204, the body camera may transmit video and sensor data. The body camera may transmit all of the locally buffered video and/or sensor data or may transmit video and/or sensor data from some set period of time before the button press, or may transmit video and/or sensor data starting at the time the button was pressed, or may transmit video and/or sensor data starting some time after the button was pressed.

The steps depicted in FIG. 12 should not be construed as limiting the particular order in which the example method 1200 must be executed. Steps may be performed in a different order. Moreover, the example method 1200 should not be limited to necessarily including all steps depicted. Steps may be removed from the method 1200. Steps depicted as separate steps in FIG. 12 may also be combined or split into further separate steps.

A body camera may include firmware that may be updated remotely and/or via a wireless connection. A body camera may be provisioned over the air such that it is updated to conform to a policy of use. For example, a policy of use may change from requiring streaming video at all times to requiring a body camera to allow its wearer to be able to manually turn off a streaming video feed. Additionally or alternatively, a body camera may be configured such that audio recording is shut off. In this way, the video may be recorded without audio.

An embodiment of a body camera implemented in accordance with the teachings herein may be worn on the uniform of an officer similar to that shown in FIG. 1. Additionally or alternatively, an embodiment of a body camera may include any suitable mounting accessories to mount the body camera to other locations on a person such as on a hat, on a shoulder, on a coat, on a shirt or coat pocket, on a belt, on a pant leg, etc. Additionally or alternatively, a body camera may be integrated into the clothing or uniform of the wearer. For example, a body camera may be integrated directly into a bullet-proof vest or the like, into a hat or helmet, into a communication device such as a walkie-talkie, etc.

Though the above examples and embodiments focus on a wearable body camera and use in a law enforcement context, the body camera disclosed herein may be used in a security or surveillance context wherein it is remotely deployed away from a person. For example, an embodiment of a body camera may be a camera including the above described sensors, connectivity, and peripherals deployed as a commercial or home security camera. The body camera may also be used outside of the field of law enforcement such as a child monitoring device, in a firefighting capacity, or as a monitoring device during exploration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus comprising:
   a digital camera configured to capture video data;
   one or more sensors configured to capture associated sensor data, wherein the one or more sensors include an inertial measurement unit (IMU);
   a global positioning system (GPS) receiver configured to determine location information;
   a processor configured to:

receive the video data, sensor data, and location information;

determine that a wearer of the apparatus has been shot based on data received from the IMU;

generate an augmented video stream by periodically marking the video data with contemporaneous location information and sensor data;

mark the video data with an indication of a gunshot responsive to determining that the wearer of the apparatus has been shot; and a wireless transceiver configured to automatically stream the augmented video stream in response to an event detected via at least one of the one or more sensors or in response to a determined location.

2. The apparatus of claim 1, wherein the processor is further configured to mark the video data with an event corresponding to at least a portion of the sensor data.

3. The apparatus of claim 2, wherein the processor is further configured to compare the sensor data to at least one threshold and mark the video data with the event on a condition that the sensor data exceeds the at least one threshold.

4. The apparatus of claim 1, wherein the processor is further configured to determine a wireless connection condition; and wherein the wireless transceiver is further configured to:
transmit the augmented video stream at a relatively higher resolution on a condition that the wireless connection condition is determined to be above a first threshold; and
transmit the augmented video stream at a relatively lower resolution on a condition that the wireless connection condition is determined to be below the first threshold.

5. The apparatus of claim 4, wherein the wireless transceiver is further configured to transmit the location information and sensor data without the video data on a condition that the wireless connection is determined to be below a second threshold that is lower than the first threshold.

6. The apparatus of claim 1, wherein the digital camera has a 360 degree field of view.

7. The apparatus of claim 1, wherein the wireless transceiver is configured to stream the augmented video stream via a Long Term Evolution (LTE) or LTE-Advanced (LTE-A) wireless network.

8. The apparatus of claim 1, wherein the processor, in conjunction with the GPS receiver, is configured to determine that the apparatus has entered into a location corresponding to a predefined geo-fence, and wherein the wireless transceiver is further configured to automatically stream the augmented video stream in response to determining that the apparatus has entered the location corresponding to the predefined geo-fence.

9. The apparatus of claim 1, wherein the wireless transceiver is configured to transmit the augmented video stream to a remote server on a condition that the wireless transceiver detects a presence of a predetermined wireless connection.

10. A method for execution by a body camera, the method comprising:

capturing video data;

capturing sensor data associated with one or more sensors, wherein the one or more sensors include an inertial measurement unit (IMU);

determining location information corresponding to the body camera;

determining that a wearer of the body camera has been shot based on data received from the IMU;

generating an augmented video stream by periodically marking the video data with contemporaneous location information and sensor data;

marking the video data with an indication of a gunshot responsive to determining that the wearer of the body camera has been shot; and automatically streaming the augmented video stream in response an event detected via at least one of the one or more sensors or in response to a determined location.

11. The method of claim 10, further comprising marking the video data with an event corresponding to at least a portion of the sensor data.

12. The method of claim 11, further comprising comparing the sensor data to at least one threshold and marking the video data with the event on a condition that the sensor data exceeds the at least one threshold.

13. The method of claim 10, further comprising:
determining a wireless connection condition;
transmitting the augmented video stream at a relatively higher resolution on a condition that the wireless connection condition is determined to be above a first threshold; and
transmitting the augmented video stream at a relatively lower resolution on a condition that the wireless connection condition is determined to be below the first threshold.

14. The method of claim 13, further comprising transmitting the location information and sensor data without the video data on a condition that the wireless connection is determined to be below a second threshold that is lower than the first threshold.

15. The method of claim 10, wherein the capturing the video data includes capturing the video data with a 360 degree field of view.

16. The method of claim 10, wherein the automatically streaming the augmented video stream includes streaming the augmented video stream via a Long Term Evolution (LTE) or LTE-Advanced (LTE-A) wireless network.

17. The method of claim 10, further comprising:
determining that the body camera has entered into a location corresponding to a predefined geo-fence; and
automatically streaming the augmented video stream in response to determining that the body camera has entered the location corresponding to the predefined geo-fence.

18. The method of claim 10, further comprising transmitting the augmented video stream to a remote server on a condition that a presence of a predetermined wireless connection is detected.

* * * * *